US007260162B2

(12) United States Patent
Piirainen

(10) Patent No.: US 7,260,162 B2
(45) Date of Patent: Aug. 21, 2007

(54) METHOD AND APPARATUS FOR SELECTING AN EQUALIZATION ALGORITHM DEPENDING ON THE USED CODING ALGORITHM OR ON THE CHANNEL QUALITY

(75) Inventor: Olli Piirainen, Oulu (FI)

(73) Assignee: Nokia Corporation, Espoo (FI)

( * ) Notice: Subject to any disclaimer, the term of this patent is extended or adjusted under 35 U.S.C. 154(b) by 854 days.

(21) Appl. No.: 10/168,632

(22) PCT Filed: Dec. 15, 2000

(86) PCT No.: PCT/EP00/12801

§ 371 (c)(1),
(2), (4) Date: Sep. 24, 2002

(87) PCT Pub. No.: WO01/48966

PCT Pub. Date: Jul. 5, 2001

(65) Prior Publication Data

US 2003/0058974 A1 Mar. 27, 2003

(30) Foreign Application Priority Data

Dec. 24, 1999 (GB) .................................. 9930716.7

(51) Int. Cl.
*H03D 1/06* (2006.01)
(52) U.S. Cl. ...................... 375/348; 375/229; 375/346; 708/323; 333/28 R

(58) Field of Classification Search ................ 375/229, 375/232, 316, 324, 341, 346, 348, 350, 230, 375/322, 340; 333/18, 28 R, 17.1, 24 R; 708/200, 214, 322, 323, 100, 300
See application file for complete search history.

(56) References Cited

U.S. PATENT DOCUMENTS

| 5,394,249 | A | * | 2/1995 | Shimoda et al. ............. 386/124 |
| 5,541,956 | A | * | 7/1996 | Ueda .......................... 375/232 |
| 5,844,951 | A | * | 12/1998 | Proakis et al. .............. 375/347 |
| 6,320,852 | B1 | * | 11/2001 | Obuchi et al. .............. 370/328 |
| 6,408,023 | B1 | * | 6/2002 | Abdesselem et al. ....... 375/232 |
| 6,501,610 | B1 | * | 12/2002 | Sugawara et al. ............ 360/65 |

FOREIGN PATENT DOCUMENTS

EP 0 345 675 A2 12/1989

(Continued)

OTHER PUBLICATIONS

Patent Abstracts of Japan 62214736 Sep. 21, 1987.

(Continued)

*Primary Examiner*—Pankaj Kumar
*Assistant Examiner*—Naheed Ejaz
(74) *Attorney, Agent, or Firm*—Squire, Sanders & Dempsey L.L.P.

(57) ABSTRACT

A method and apparatus for improving the quality of a signal which has been detrimentally affected by inter-symbol interference due to time dispersion. The invention includes selecting one of at least two algorithms of equalization and after the selection, and processing the signal by performing steps according to the selected algorithm.

35 Claims, 2 Drawing Sheets

FOREIGN PATENT DOCUMENTS

| | | |
|---|---|---|
| EP | 0 426 026 A2 | 5/1991 |
| EP | 0580482 | 1/1994 |
| EP | 0 725 480 A1 | 1/1996 |
| EP | 0725480 | 8/1996 |
| EP | 0841786 | 5/1998 |
| EP | 0966113 | 12/1999 |
| GB | 2260068 | 3/1993 |
| GB | 2 273 228 A * | 11/1993 |
| GB | 2273228 | 6/1994 |
| JP | 62214736 | 9/1987 |
| JP | 1314009 | 12/1989 |
| JP | 3132104 | 6/1991 |
| JP | 514131 | 1/1993 |

OTHER PUBLICATIONS

Patent Abstracts of Japan 05014131 Jan. 22, 1993.
Patent Abstracts of Japan 01314009 Dec. 19, 1989.
Patent Abstracts of Japan 02288739 Nov. 18, 1990.
Seshadri, Nambi, et al., "Advanced Techniques for Modulation, Error Correction, Channel Equalization, and Diversity", 8010 AT&T Technical Journal, 72 (1993) Jul./Aug. No. 4, New York, US pp. 48-63.
Robertson, Patrick, et al., "A Comparison of Optimal and Sub-Optimal MAP Decoding Algorithms Operating in the Log Domain", Proceedings of the Conference on Communications (ICC), New York, US, Jun. 18, 1995, pp. 1009-1013.
International Search Report.

* cited by examiner

METHOD AND APPARATUS FOR SELECTING AN EQUALIZATION ALGORITHM DEPENDING ON THE USED CODING ALGORITHM OR ON THE CHANNEL QUALITY

BACKGROUND OF THE INVENTION

The present invention relates to transmission of information and in particular to methods and means for improving the quality of a signal which is detrimentally affected by degradation of a signal path.

During transmission of electromagnetic signals from a transmitter to a receiver via a signal channel, regardless of it being a fixed wire channel or a radio channel, the concept of signal deterioration must be considered. In very general terms, irrespective of whether or not the signal is representing analogue or digital information, there are detrimental effects due to noise, path loss and fading.

In the case of signals representing sequences of digital information there enters a further problem, that of time dispersion of the digital sequence. In particular, mobile communication systems are in most cases affected by the phenomenon of time dispersion. An understanding of time dispersion can easily be gained by grasping the concept of multipath reception. Multipath reception is experienced by a receiver, such as e.g. a mobile telephone, located at some distance from a transmitter, i.e. a base station antenna in the case of mobile telephone receiver, receiving an emitted signal via a multitude of geometrical paths through the atmosphere. The receiver may receive the signal directly from the transmitter as well as reflected from distant objects, such as hills or buildings. The main feature being that the signal paths are different in length.

The effect of the time dispersion on the digital signal sequence is that of so called inter symbol interference (ISI). Inter Symbol Interference means that consecutive symbols, i.e. bits in the sequence, interfere with each other making it difficult for the receiver to decide which symbol is actually transmitted by the transmitter. If a reflected part of the transmitted signal arrives exactly one bit time after a part of the signal which is received directly without being reflected, the receiver will detect a first symbol from the reflected part at the same time as it detects a second symbol from the direct part of the signal. If the symbols, i.e. bits, are different, e.g. the first symbol being zero and the second symbol being one the symbols interfere more or less destructively, and the receiver may be confused regarding the interpretation of the symbol which was actually received.

It is hence a problem of how to improve the quality of a signal, which has been subject to detrimental effects such as inter symbol interference.

SUMMARY OF THE INVENTION

According to one aspect of the present invention, there is provided a method of improving the quality of a signal, which has been detrimentally affected by degradation of a signal path such as inter-symbol interference due to time dispersion in a digital device. The method comprises steps of selecting one of at least two algorithms of equalization and after the selection, processing the signal by performing steps according to the selected algorithm.

It is known that a use of differing coding schemes during transfer of a sequence has implications on the bit error rate of the sequence after decoding. As will be discussed in some detail below, block coding, convolution coding and hybrid coding may be used. These have different implications for the choice of equalization such that, a different bit error rate of the decoded sequence is obtained when using different combinations of equalizing schemes and decoding schemes. For example, in the case of a strongly coded sequence, using a so called Bahl-Jelinek (MAP) equalizing algorithm in combination with a decoding scheme capable of decoding the strongly coded sequence results in a lower bit error rate as seen after channel decoding as would a combination with a Viterbi equalizing algorithm. The reason for this is that a MAP equalizing algorithm generates high quality soft information relating to the processed sequence. This soft information is utilized in the decoder to produce an output which is of higher quality than if a Viterbi equalizing algorithm were to be used.

In terms of selection of equalizer type, or rather equalizer algorithm, this problem of maintaining lowest possible bit error rate has not been previously addressed in any other way than a simple pre-implementation choice of one single equalizer type. Hence, the equalizer selection has previously been a case of compromise leading to a non-optimal result in terms of the bit error rate of the received signal.

An advantage of the present invention is that it maintains a best possible quality of the signal as measured by a lowest possible bit error rate. This is achieved irrespective of channel quality arid coding scheme used for error correction and detection.

Another advantage is that the performance of a signal receiver may easily and quickly be improved since the inventive method, in principle, can be programmed into already existing signal processing equipment in a receiver.

According to another aspect of the present invention there is provided a signal receiver for improving the quality of a signal which is detrimentally affected by degradation of a signal path, said receiver comprising means for selecting one of at least two algorithms of equalization, and means for processing the signal by performing steps according to the selected equalization algorithm, thereby reducing the effect of the signal path degradation.

According to a further aspect of the present invention there is provided a personal communication device and/or communication station comprising a signal receiver of the invention.

The communication station may, for example, be a mobile communication network base transceiver station (BTS). It may, for example, be for a digital network. If it is to operate in a TDMA system such as GSM or IS-136, then ideally, the station is adapted to work according to EDGE (enhanced data GSM evolution).

DETAILED DESCRIPTION OF THE INVENTION

Figure 1:
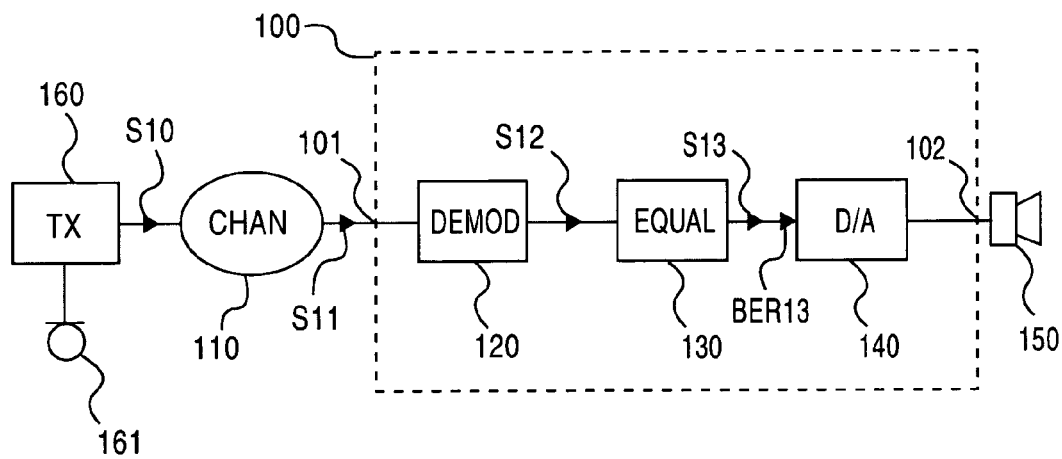
FIG. 1 shows a schematic block diagram of a first embodiment of a digital signal receiver according to the invention.

Although signal transfer in general is subject to all types of-perturbations, the description to follow will concentrate on the phenomenon of inter symbol interference and the methods and means in a digital receiver in a mobile communication system that address the detrimental effect on information transfer the inter symbol interference causes. Moreover, it is assumed that it is within the knowledge of the person skilled in the art that a digital receiver includes a multitude of means other than those discussed herein. Examples of such means are modulators and demodulators as well as, in the case of time division cellular systems such as e.g. GSM, D-AMPS, PDC etc., methods and means for interleaving.

After reception of a suitably modulated signal, a digital receiver demodulates the signal into a sequence of words comprising digital bits. At least a part of the sequence contains information, which for the purpose of simplicity may be denoted as user information. A typical example in the case of a mobile telephone is of course digitally encoded speech.

After reception and demodulation the digital signal sequence has to be processed in order to remove any ambiguities regarding symbol interpretation due to the inter symbol interference as discussed above. This may be performed in a so-called equalizer.

By regular incorporation of predetermined symbol sequences that may comprise one or more bits in the transmitted signal, the equalizer may calculate a so-called model of the channel through which the information and, the known and predetermined, symbol sequences have passed. These symbol sequences are usually denoted training sequences.

The channel model is obtained by regularly performing correlation of the received training sequences and the known training sequence. Estimates of different candidate user information parts of the received digital sequences are fed through the calculated channel model resulting in different output sequences. These output sequences are then compared with the user information part of the actually received digital sequence. Depending on the outcome of the comparison, the best candidate of the user information part of the sequences is then selected. The process of comparing and deciding when a good enough user information sequence has been obtained may be performed, as is known in the art, using different algorithms. One example is the Viterbi algorithm (as for example described in "The Viterbi algorithm", Forney, G. D., Proceedings of the IEEE, Vol. 61, No. 3, pp. 268–278, March 1973). Other examples include symbol by symbol MAP algorithms (as for example described in "A comparison of optimal and sub-optimal MAP decoding algorithms operating in the log domain", Robertson, P. Et al., ICC '95, pp. 1009–1013) where so-called MAP, Max-log-MAP and Log-MAP algorithms are discussed.

After equalizing the digital sequence, whereby the inter symbol interference is treated, the sequence may be decoded in order to obtain a user information sequence which, ideally, is the same as the one originally transmitted through the channel.

In the field of transmission of digital information, the quality of the transmitted signal is usually expressed in terms of the number of received bits that are correct. This is a measure denoted as bit error rate (BER), which is the percentage of wrongly detected bits. A good quality implies a low value of the BER. Due to the fact that it is impossible to obtain a zero BER, allowance must be made for a non-zero BER while still being able to restoring the information or, at least, being able to ascertain whether or not the information is correctly received.

The restoration process is usually called channel coding which in principle performs the acts of adding redundancy to the transmitted sequence by spreading the information over a larger number of bits. The redundancy can be of two kinds, block redundancy and redundancy created by convolution.

One example of block coding is systematic block coding. Systematic block coding performs correction of errors by adding blocks of check bits to the sequence of information to be transmitted. These check bits have a predetermined relation to the sequence of information to which it is associated, and is dependent only on a certain part, or block, of the sequence of information, and is hence denoted block codes. Blocks of parity bits are of this category, and in general the main feature of block coding is that the sequence of information bits remains unchanged.

Convolution coding, on the other hand, codes the sequence of information such that the coded sequence of bits depends not only on bits in a single block of information, but rather on bits from preceding blocks of information. This results in that, in contrast to block coded information, the sequence of information bits are changed according to a convolution scheme.

In both of these cases, block coding and convolution coding, the overall effect on the transmitted bit sequence is that coding bits are added to the transmitted sequence, which after reception and equalization in a receiver are decoded in a decoder.

Block coding is often used in applications with block oriented signaling such as applications where automatic repeat request (ARQ) is used. Automatic repeat request signaling implies that, when an error is detected, retransmission is requested.

Convolution coding, on the other hand, is more associated with error correction, that is situations where it is not acceptable to delay the transfer of information by repeating a transmission. A typical example in this respect is of course when real time speech is to be transmitted in a mobile telephone network.

Block coding and convolution coding may be combined such that a block of coding bits are added to a sequence of information after which this block coded sequence, and of course also succeeding blocks, is convolution coded. An effect of such a combination of coding principles is that errors may be corrected, by convolution decoding, and any remaining errors may at least be detected, by block decoding, thus simplifying a decision of whether or not to use the received information. The means for performing this kind of combined coding are often denoted hybrid coders and decoders, and, depending on the degree of redundancy introduced in the sequence, a terminology of coding strength is used.

Needless to say, all functionality discussed is preferably implemented in digital integrated circuitry, such as digital signal processors (DSP) controlled by software.

Illustrated in FIG. 1 is a first example of a digital signal receiver 100. The receiver 100 includes a signal input terminal 101 and a signal output terminal 102 as well as a demodulator 120, an equalizer 130 and a combined speech decoder and digital-to-analog (D/A) converter 140.

A modulated signal S11, containing user information in the form of speech detected in a microphone 161 attached to a transmitted 160, arrives at the input 101 of the receiver 100 via a channel 110. It is to be understood that a person skilled in the art fully understands all necessary signal processing involved, i.e., analog-to-digital conversion of speech, speech coding, signal sequence coding , as e.g. discussed above as well as modulation and transmission through the channel 110. Needless to say, this very general example is applicable to any transmitter-channel-receiver system, as for example a cellular network comprising mobile phones and base stations. In such an example, the channel 110, as discussed above, usually affects the transmitted signal S11 in such a way that effects of time dispersion must be taken care of in the receiver 100.

The demodulator 120 demodulates the incoming signal S11 according to procedures known in the art, creating a demodulated digital signal S12 in the form of a digital bit-sequence. It is known in the art that the signals and digital bit sequences discussed herein, depending on the type of digital communication system in question, have differing content. Nevertheless, in most digital systems, and in particular in cellular radio systems such as GSM, D-AMPS and PDC, the concept of regular transmission of training sequences is a prerequisite for equalization of the demodulated signal. As already discussed above, training sequences are predetermined symbol sequences comprising bit sequences, known to both transmitter and receiver. The training sequences are transmitted together with user information via the channel 110, and the demodulated signal S12 thus contains bit sequences of user information, such as speech data, regularly interspersed with training bit sequences.

The equalizer 130 includes means for performing a function of correcting the demodulated signal S12 with respect to inter-symbol interference as discussed above. However, according to the present invention, the correction is performed in a manner including a selection of one equalizer among a plurality of available equalizers. In essence this entails selecting an appropriate equalizer algorithm, as will be described in some detail below in connection with FIG. 3.

After equalization, an equalized signal S13 emanating from the equalizer 130 is converted, in accordance with known art in a digital-to-analog converter 140 which incorporates the function of speech decoding, to a corresponding analog signal suitable for reproduction in the loudspeaker 150. A measure of the quality of the equalized signal S13 is, as discussed above, a bit error rate BER13.

Figure 2:
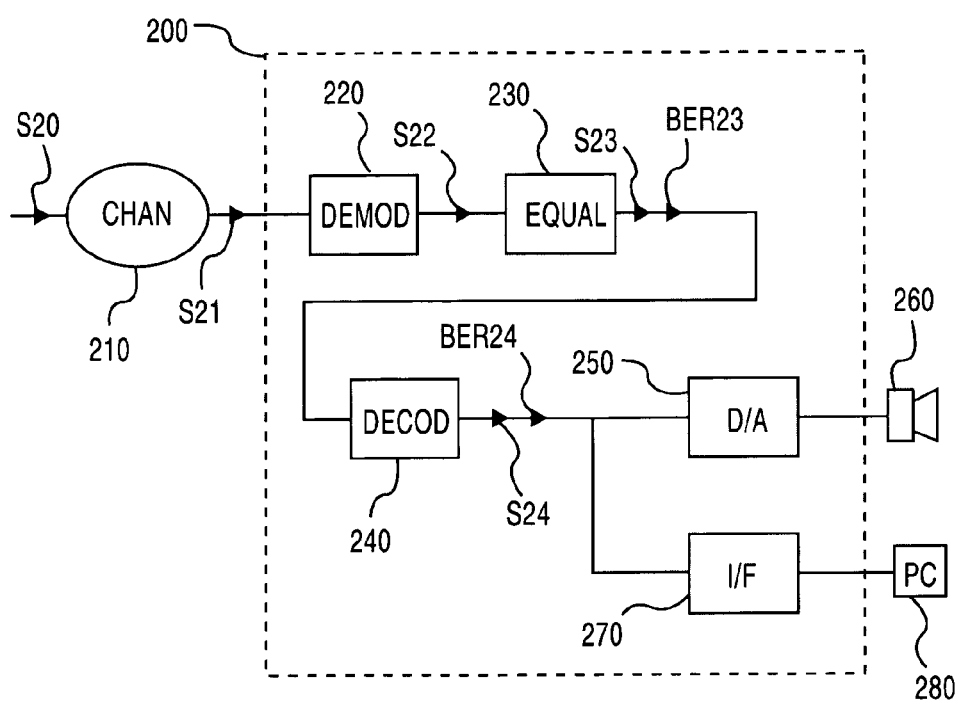
FIG. 2 shows a schematic block diagram of a second embodiment of a digital signal receiver according to the invention.

FIG. 2 illustrates a slightly more complex digital receiver 200 than the receiver 100 described above in connection with FIG. 1. A transmitted signal S20 is received via a channel 210 in a demodulator 220. The received signal S21 is detrimentally affected by time dispersion in the channel 210. After demodulation in the demodulator 220, the demodulated signal S22 is equalized in an equalizer 230, as will be discussed below, resulting in an equalized signal S23. A measure of the quality of the equalized signal S23 is a bit error rate BER23.

In contrast to the receiver 100 described above, the receiver in the present example also includes a channel decoder 240. As described above, a signal comprising a digital bit sequences is usually coded according to suitably selected coding schemes; block coding and convolution coding being two types of coding schemes used in, e.g., GSM networks. To fully take advantage of features of different coding schemes, it is often desirable in a digital transmitter-receiver system to have a possibility to dynamically select between different coding schemes. This may be due to, e.g., variations in the quality of the channel as expressed in terms of channel noise and signal fading.

After processing by the decoder 240, a decoded signal S24, with a corresponding bit error rate BER24, is converted in a combined speech decoder and digital-to-analog converter 250 and output as sound via a loudspeaker 260.

FIG. 2 illustrates a receiver having a dual function with respect to the processing of the decoded signal S24. It is, as the receiver illustrated in FIG. 1, capable of processing a signal comprising of digitally encoded speech, as in a traditional telephony system. In addition, it is capable of processing a signal comprising of digital data produced on a transmitting side of the channel 210 by, e.g., a computer connected to a transmitter.

From the viewpoint of the demodulator 220, equalizer 230 and channel decoder 240, the user information of a signal is irrelevant. However, in the case of the user information being data from a computer, the signal S24 is processed by means capable of interpreting the computer generated data. Thus, as FIG. 2 further illustrates, the channel decoded signal S24 may also be processed by an interface unit 270 to which a computer 280 is connected.

As discussed above, the quality of a digital signal is preferably expressed in terms of bit-error-rates. In particular, the bit-error-rate before decoding BER23 and bit-error-rate after decoding BER24 will be used in the following to exemplify the present invention where a selection is made of one equalizer algorithm among a plurality of equalizer algorithms within the equalizer 230.

Important factors that have implications on the bit-error-rates BER23 and BER24, are the quality of the channel 210, as expressed by, e.g., channel noise, and the combination of type of equalizer algorithm selected in the equalizer 230 and the type of coding scheme used within the decoder 240.

A general feature of the Max-Log MAP equalizer algorithm is that, by a combination effect with the decoding scheme, the better the channel coding is to correct and detect errors in the signal, the lower the bit-error-rate BER24 of the signal S24 out of the decoder 240 gets. The reason for this is that the channel decoding schemes preferred in the art are capable of taking advantage of the so-called soft information obtained from the processing of the signal S22 in the equalizer 230.

On the other hand, a selection of a Viterbi instead of a Max-Log MAP equalizing algorithm usually results in a lower bit-error-rate BER23 of the signal S23 out of the equalizer 230, while not necessarily resulting in a lower bit-error-rate BER24 after decoding.

It is hence of some importance, at least in terms of obtaining an optimally low bit-error-rate BER24 of the signal S24 emanating from the decoder 240, to have a method of selecting an appropriate equalizer algorithm for any given situation, i.e. for any channel quality and any coding scheme used.

Figure 3:
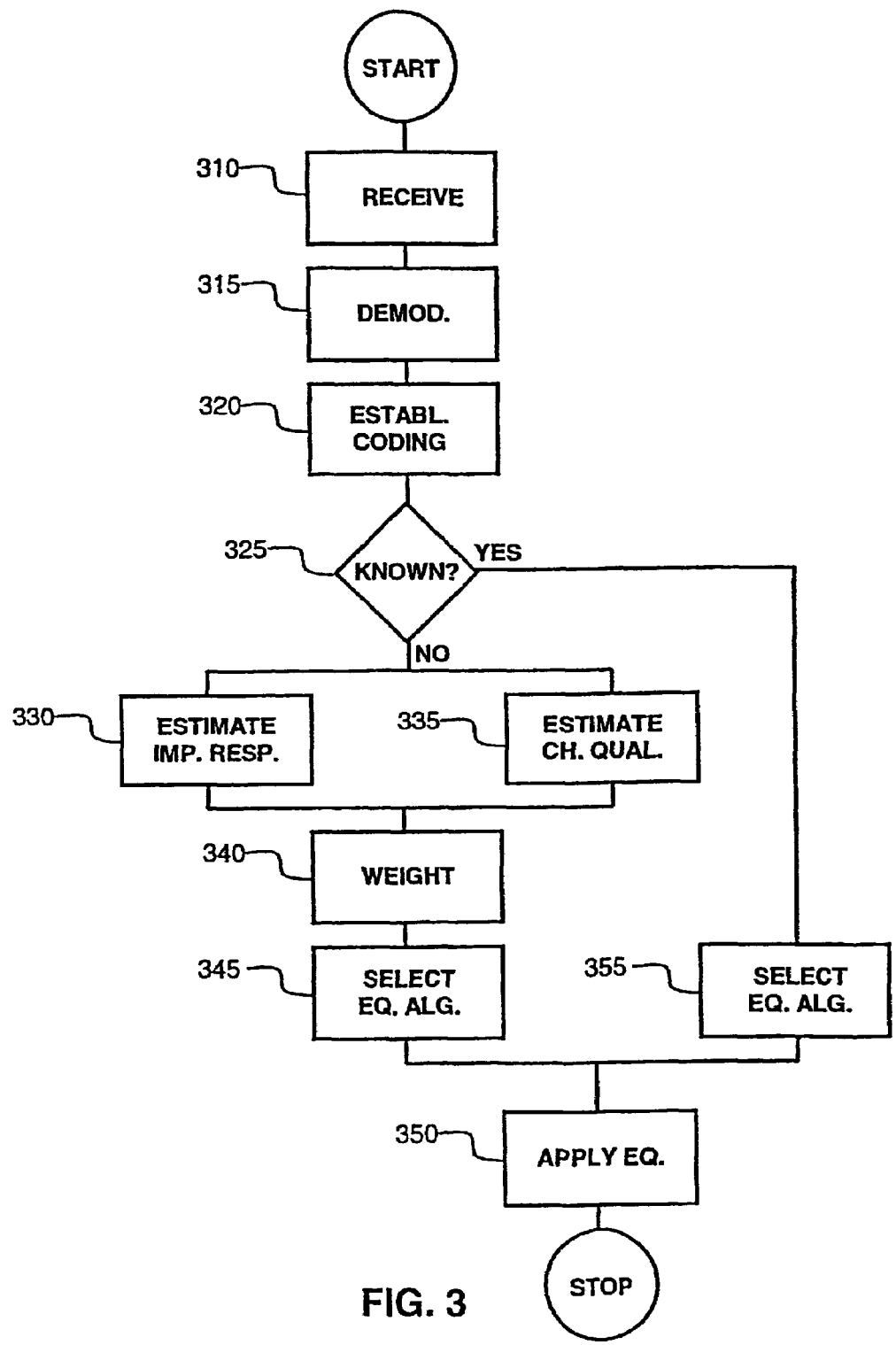
FIG. 3 shows a schematic flow diagram of a method according to the invention.

FIG. 3 illustrates schematically a method according to the invention, where this equalizer selection is performed. While referring to blocks in FIG. 3, references will also be made to appropriate parts of FIGS. 1 and 2, and it is thus understood that FIG. 3 should be considered in conjunction with both FIG. 1 and FIG. 2. It should however be noted that the blocks in FIGS. 1 and 2 are defined in terms of functionality, and should not necessarily be understood to be physically separated. In fact, as already indicated above, a preferred implementation of the invention is, e.g., in a digital signal processor running appropriately written software.

In a reception step 310, the receiver 100,200 receives a signal S11,S21 via a channel 110,210. As pointed out above, the channel 110,210 can be of any character, including radio. The received signal S11,S21 is according to the art suitably modulated.

In a demodulating step 315, the incoming signal S11,S21 is demodulated, thus yielding a digital signal S12,S22 in the form of a bit sequence. The bit sequence is, as discussed above, detrimentally affected, for example by intersymbol interference.

In a step 320, the channel coding scheme used by the transmitter 160 is established. Usually this is a simple, if not trivial, step of noting which pre-determined scheme of channel coding is used in the situation at hand. This step 320 may result in establishing that the coding scheme is unknown.

In a decision step 325, the coding scheme establishment in step 320 is used to decide what procedures to take to further process the signal S12,S22.

In the case that the coding scheme can be established, the selection of equalizer algorithm is dependent only on the type of coding scheme used, as discussed above. The equalizer selection is hence performed according to this example in a single step 355, followed by the actual processing according to the selected equalization algorithm in an equalization step 350.

However, in the case that the coding scheme can not be established, the selection of equalizer algorithm will need information in terms of an estimate of the channel quality. This quality estimation and equalizer selection is performed according to this example in a number of steps 330–345 as will be described below. Although not illustrated, channel quality may be estimated using other criteria as shown below such as, e.g., a measure of the signal quality in terms of bit error rate after decoding (BER24 in FIG. 2).

In a response estimation step 330, a channel impulse response is estimated according to the art, using the known training bit sequences of the signal S12,S22.

In a quality estimation step 335, the channel quality in terms of noise and interference is estimated according to the art based on the received signal S11,S21.

In a weighting step 340, the estimated channel impulse response and the estimated channel noise is used to calculate a weighting function, which is applied to the impulse response and the bit sequence.

Following this in a selection step 345, Trellis calculations are performed according to the art, in order to establish which equalizer algorithm to use to equalize the information in the signal S12,S22.

The equalizing step 350, then performs the actual equalization, as described above.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A method of improving the quality of a signal in a circuit, transmitted via a signal channel, which is detrimentally affected by inter-symbol interference, said method comprising the steps of:
    selecting one of at least two algorithms of equalization, and
    processing the signal by performing steps according to the selected equalization algorithm, thereby reducing the effect of inter-symbol interference,
    wherein the signal is coded according to at least one type of coding scheme, and the method further includes a step of:
    decoding the signal according to the at least one coding scheme, and that the step of selecting one algorithm of equalization includes a dependence on the type of coding scheme
    wherein the step of selecting one algorithm of equalization is based on the type of coding scheme, and further includes
    making a decision based on an expected type of coding scheme used to generate the coded signal, wherein the expected type is determined based on a measure of quality of a channel.

2. A method according to claim 1, wherein the step of selecting one algorithm of equalization in dependence on the type of coding scheme includes a decision based on a-priori knowledge about the coding scheme used to code the signal.

3. A method according to claim 1, further including:
    measuring the quality of the channel, and that selecting one algorithm of equalization includes a dependence of the quality.

4. A method according to claim 1, wherein the quality of the channel is measured by
    measuring channel noise.

5. A method according to claim 1, wherein the quality of the channel is measured by
    measuring a bit error rate.

6. A method according to claim 5, wherein the step of measuring the bit error rate further includes
    processing the signal after equalization.

7. A method according to claim 5, wherein the step of measuring the bit error rate includes
    processing the signal after equalization and decoding.

8. A method according to claim 1, wherein the step of selecting one of at least two algorithms of equalization includes selecting a Viterbi algorithm.

9. A method according to claim 1, wherein the step of selecting one of at least two algorithms of equalization includes selecting a Max-Log MAP algorithm.

10. A method according to claim 3, further characterised in that the step of measuring the quality of the channel includes:
    measuring channel noise.

11. A method according to claim 3, wherein the step of measuring the quality of the channel includes
    measuring a bit error rate.

12. A digital signal receiver, for improving the quality of a signal, said receiver comprising:
    selecting unit configured to select one of at least two algorithms of equalization, and
    processing unit configured to process the signal by performing steps according to the selected equalization algorithm, thereby reducing the effect of inter-symbol interference,
    wherein the signal is arranged to be coded according to at least one type of coding scheme, and the receiver further comprises:
    decoding unit configured to decode the signal according to the at least one coding scheme, and that the selecting unit includes a handling unit configured to handle a dependence on the type of coding scheme,
    and wherein in the selecting unit, the selection is based at least in part on the type of coding scheme, and further includes a decision unit configured to make a decision based on an expected type of coding scheme used to generate the coded signal, wherein the expected type is determined by the decision unit based on evaluation of a measure of quality of a channel, wherein the digital signal receiver is configured to improve the quality of a signal, transmitted via a signal channel, which is detrimentally affected by inter-symbol interference.

13. A digital signal receiver according to claim 12, wherein the selecting unit configured to select one algorithm of equalization in dependence on the type of coding scheme further includes a decision making unit configured to make a decision based on a-priori knowledge about the coding scheme used to code the signal.

14. A digital signal receiver according to claim 12, further comprising:
measuring unit configured to measure the quality of the channel, and that the selecting unit configured to select one algorithm of equalization handles a dependence of the channel quality.

15. A digital signal receiver according to claim 12, wherein the quality of the channel is measured by:
a measuring unit configured to measure channel noise.

16. A digital signal receiver according to claim 12, wherein the measuring unit is further configured to:
measure a bit error rate.

17. A digital signal receiver according to claim 16, wherein the measuring unit is further configured to
process the signal after equalization.

18. A digital signal receiver according to claim 16, wherein the measuring unit is further configured to:
processes the signal after equalization and decoding.

19. A digital signal receiver according to claim 14, wherein the selecting unit is further configured to select a Viterbi algorithm.

20. A digital signal receiver according to claim 14, wherein the selecting unit is further configured to select a Max-Log MAP algorithm.

21. A personal communication device for communicating in a digital communication network, further comprising a digital signal receiver according to claim 12.

22. A communication station for communicating in a digital communication network, further comprising a digital signal receiver according to claim 12.

23. A communication system, further comprising a multitude of digital signal receivers according to claim 12.

24. A digital signal receiver according to claim 14, wherein the measuring unit is further configured to:
measures channel noise.

25. A digital signal receiver according to claim 14, wherein the measuring unit is further configured to:
measure a bit error rate.

26. A method of improving the quality of a signal in a signal receiver, transmitted via a signal channel, which is detrimentally affected by degradation of a signal path, said method comprising:
selecting one of at least two algorithms of equalization, and
processing the signal by performing steps according to the selected equalization algorithm, thereby reducing the effect of the signal path degradation,
wherein the signal is coded according to at least one type of coding scheme, and the method further includes:
decoding the signal according to the at least one coding scheme, and that the step of selecting one algorithm of equalization includes a dependence on the type of coding scheme,
wherein the step of selecting one algorithm of equalization is based at least in part on the type of coding scheme and further includes making a decision based on an expected type of coding scheme used to generate the coded signal, wherein the expected type of coding scheme is determined based on a measure of quality of a channel.

27. A signal receiver for improving the quality of a signal, said receiver comprising:
selecting unit configured to select one of at least two algorithms of equalization, and
processing unit configured to processes the signal by performing steps according to the selected equalization algorithm, thereby reducing the effect of the signal path degradation,
wherein the signal is arranged to be coded according to at least one type of coding scheme, and the receiver further comprises:
decoding unit configured to decode the signal according to the at least one coding scheme, and that the means for selecting unit is further configured to handle a dependence on the type of coding scheme,
wherein in the selecting unit the selection is based at least in part on the type of coding scheme, and further includes a decision unit configured to make a decision based on an expected type of coding scheme used to generate the coded signal, wherein the expected type is determined by the decision unit and is based on an evaluation of a measure of quality of a channel,
wherein the signal receiver is configured to improve the quality of a signal, transmitted via a signal channel, which is detrimentally affected by degradation of a signal path.

28. A communication station for improving the quality of a signal, said station comprising:
selecting unit configured to select one of at least two algorithms of equalization, and
processing unit configured to processes the signal by performing steps according to the selected equalization algorithm, thereby reducing the effect of the signal path degradation,
wherein the signal is configured to be coded according to at least one type of coding scheme, and the receiver further comprises:
decoding unit configured to decode the signal according to the at least one coding scheme, and that the selecting unit is further configured to handle a dependence on the type of coding scheme,
wherein in the selecting unit further includes a decision unit configured to make a decision based on an expected type of coding scheme used to generate the coded signal, wherein the expected type is determined by the decision unit based an evaluation of a measure of quality of a channel,
wherein the communication station is configured to improve the quality of a signal, transmitted via a signal channel, which is detrimentally affected by degradation of a signal path.

29. A communication station as claimed in claim 28 which is a base transceiver station.

30. A communication station as claimed in claim 29 which is a GSM base transceiver station.

31. A communication station as claimed in claim 29, which is an EDGE base transceiver station.

32. A communication station as claimed in claim 28, wherein the degradation of the signal path is at least one of noise, path loss, fading and dispersion.

33. A communication station as claimed in claim 30, which is an EDGE base transceiver station.

34. A personal communication device for improving the quality of a signal, said device comprising:

selecting unit configured to select one of at least two algorithms of equalization, and processing unit configured to processes the signal by performing steps according to the selected equalization algorithm, thereby reducing the effect of the signal path degradation, wherein the signal is configured to be coded according to at least one type of coding scheme, and the receiver further comprises:

decoding unit configured to decode the signal according to the at least one coding scheme, and that the selecting unit is further configured to handle a dependence on the type of coding scheme, wherein the selecting unit is further configure to select one algorithm of equalization based is based in part on the type of coding scheme, and further includes a decision unit configured to make a decision based on an expected type of coding scheme used to generate the coded signal, wherein the expected type is determined by the decision unit and is based on an evaluation of a measure of quality of a channel, wherein the personal communication device is configured to improve the quality of a signal, transmitted via a signal channel, which is detrimentally affected by degradation of a signal path.

35. A digital signal receiver, for improving the quality of a signal, said receiver comprising:

means for selecting one of at least two algorithms of equalization, and means for processing the signal by performing steps according to the selected equalization algorithm, thereby reducing the effects of inter-symbol interference, wherein the signal is arranged to be coded according to at least one type of coding scheme, and the receiver further comprises:

means for decoding the signal according to the at least one coding scheme, and that the means for selecting one algorithm of equalization includes means for handling a dependence on the type of coding scheme, and- wherein in the means for selecting one algorithm of equalization the selection is based at least in part on the type of coding scheme, and further includes means for making a decision based on an expected type of coding scheme used to generate the coded signal, wherein the expected type is determined by the means for making a decision based on an evaluation of a measure of quality of a channel, wherein the digital signal receiver is configured to improve the quality of a signal, transmitted via a signal channel, which is detrimentally affected by inter-symbol interference.

* * * * *